United States Patent [19]
Fenelon

[11] Patent Number: 5,307,705
[45] Date of Patent: May 3, 1994

[54] STRESS DISSIPATION GEAR AND METHOD OF MAKING SAME

[76] Inventor: Paul J. Fenelon, 13 Inverary, Nashville, Tenn. 37215

[21] Appl. No.: 15,332

[22] Filed: Feb. 9, 1993

[51] Int. Cl.⁵ .................. F16H 55/14; B29C 45/14
[52] U.S. Cl. ................................... 74/411; 74/443; 74/DIG. 10; 29/527.1; 29/893; 29/893.37; 264/242; 264/250; 264/261; 264/263
[58] Field of Search ......... 74/411, 439, 443, DIG. 10; 29/893, 893.37, 527.1; 264/242, 250, 261, 263

[56] References Cited

U.S. PATENT DOCUMENTS

| | | | |
|---|---|---|---|
| 284,290 | 9/1883 | Gilliland | 74/411 X |
| 288,134 | 11/1883 | Stone, Jr. | 74/443 |
| 379,022 | 3/1888 | Morgan | 74/443 |
| 680,654 | 8/1901 | Gomber | 74/443 |
| 820,789 | 5/1906 | Hutchins | 74/443 X |
| 1,060,865 | 5/1913 | Sundh | 475/343 |
| 1,424,203 | 8/1922 | Keller | 74/443 X |
| 1,928,763 | 10/1933 | Rosenberg | 74/443 X |
| 2,187,706 | 1/1940 | Julien | 464/90 |
| 2,307,129 | 1/1943 | Hines et al. | 74/443 X |
| 2,460,630 | 2/1949 | Fawick | 74/411 |
| 2,560,644 | 7/1951 | Hartzell | 464/75 |
| 2,702,995 | 3/1955 | Biedess | 74/411 X |
| 2,753,731 | 7/1956 | McWethy | 74/443 |
| 2,857,777 | 10/1958 | Porter | 74/432 |
| 2,939,331 | 6/1960 | Weeks | 74/443 |
| 2,961,856 | 11/1960 | Selzer | 74/443 X |
| 3,020,036 | 2/1962 | Kleinschmidt | 267/1 |
| 3,071,850 | 1/1963 | Haushalter | 29/450 |
| 3,216,267 | 11/1965 | Dolza | 74/411 X |
| 3,257,860 | 6/1966 | Runde et al. | 74/411 X |
| 3,304,795 | 2/1967 | Rouverol | 74/411 |
| 3,667,317 | 6/1972 | Hillingrathner | 74/443 X |
| 3,757,608 | 9/1973 | Willner | 74/411 X |
| 3,943,788 | 3/1976 | Kummel et al. | 74/411 |
| 3,952,546 | 4/1976 | Nakano et al. | 464/90 |
| 4,178,811 | 12/1979 | Shepherd | 74/574 |
| 4,674,351 | 6/1987 | Byrd | 74/411 |
| 4,680,979 | 7/1987 | Morishita et al. | 74/411 X |
| 4,951,515 | 8/1990 | Morishita et al. | 74/7 E |
| 5,127,279 | 7/1992 | Barthruff | 74/411 X |

FOREIGN PATENT DOCUMENTS

| | | | |
|---|---|---|---|
| 682196 | 11/1952 | United Kingdom . | |
| 759215 | 10/1956 | United Kingdom . | |
| 792330 | 3/1958 | United Kingdom | 74/411 |
| 989898 | 4/1965 | United Kingdom | 74/411 |

*Primary Examiner*—Allan D. Herrmann
*Attorney, Agent, or Firm*—Harness, Dickey & Pierce

[57] ABSTRACT

A gear is comprised of a central radial hub with a web radially extending therefrom and an independent radial gear-toothed rim, both of which are radially coupled by a stress dissipating resilient member attached thereto and being located in a plane parallel to that of said web. The resilient member is laterally supported by the adjacent web and the resilient member side walls are proximately parallel to the web side walls such that the resilient member is not located between the outer peripheral edge of the web and the inner peripheral edge of the rim. Furthermore, the present invention comprises a process by which such a stress dissipating gear is manufactured.

17 Claims, 3 Drawing Sheets

STRESS DISSIPATION GEAR AND METHOD OF MAKING SAME

BACKGROUND OF THE INVENTION

This invention relates generally to gears and specifically to gears having a central radial hub with a web radially extending therefrom and an independent radial gear-toothed rim, both of which are radially coupled by a stress dissipating resilient member attached thereto and being located in a plane parallel to that of the web.

The primary function of a gear is to transmit power from a power generating source to an adjacent operating device. This is achieved through the intermeshing and continuity of action between the teeth of a driving gear which is associated with the power source and the teeth of the mating gear which is associated with the operating device. Furthermore, since a gear is a rotating body, a state of dynamic equilibrium must be attained. To be in dynamic equilibrium, all of the reactions from the rotating gear must be neutralized by equal and opposite forces supporting the gear shaft.

Traditional gear design comprises a central hub, a web extending radially outward therefrom which is, in turn, peripherally bordered by an integral radial rim having geared teeth thereupon. Gear failure can occur if manufacturing tolerances, material type, and gear design are not matched to the service application. Furthermore, since gears have historically been manufactured from a single homogeneous material, the rigidity and strength of the web is greater than that of the hub and rim. Thus, torsional stresses created through start-up, shut-down or through cyclical fatigue are localized in the teeth and hub areas. As a result, gears typically fail at the root of the teeth or in the hub region. Such failures include excessive wear, plastic flow or creep, tooth bending fatigue, contact fatigue (pitting and spalling), thermal fatigue, tooth bending impact, tooth shear, tooth chipping, case crushing, torsional shear and stress ruptures. Many of these failures are due primarily to the cycling fatigue, start-up and shut-down rotational shock referenced above that is especially prevalent in gears that perform in non-constant rotation service applications.

An alternative gear design that has been used is a compliant gear having rigid hub, web, and rim members. However, a rubber-like insert or ring is located between the outer radial edge of the web and the inner radial edge of the rim. An example of this configuration is disclosed in U.S. Pat. No. 2,307,129 entitled "Shock Proof Gear", issued to Hines et al. on Jan. 5, 1943. Although this rubber-like insert is supposed to dampen audible vibrations and somewhat reduce resultant stresses within the gear, under load the rim is capable of compressing one side of the rubber-like insert such that the rotational axis of the rim could become axially offset from the rotational axis of the hub. This misalignment can cause disengagement of the gear teeth of the compliant gear from those of its mating gear. In addition, gears having this type of rubber-like insert are subject to the rim torquing away from the hub in a direction normal to the radial centerline of the hub, web and rim. Under load this movement may cause misalignment of the mating gear teeth which will localize stresses upon distinct portions of each tooth. A similar design using elastomeric laminates with a shim therebetween is disclosed in U.S. Pat. No. 4,674,351 entitled "Compliant Gear", issued to Byrd on Jun. 23, 1987.

Another compliant gear configuration is disclosed in FIG. 8 of U.S. Pat. No. 3,216,267 entitled "Rotary Motion Transmitting Mechanism For Internal Combustion Engines And The Like", issued to Dolza on Nov. 9, 1965. That gear design contains a stamped cup-shaped hub which has an outward radially extending flange and a cushioning member fully attached to the side thereof. The rim of the gear has a generally L-shaped cross section with the radial inward leg being fully attached to the opposite side of the cushioning member. In that design there are gaps between the top of the cushioning member and the inside radial surface of the rim and also a gap between the radially inward surface of the cushioning member and the radially outward horizontal edge of the hub cup section. While the gear is designed to maintain angular torsional rigidity while having radial flexibility, under load the rim of the gear may become elliptical and thus encroach upon the gaps created above and below the cushioning member. Moreover, the rotational axis of the rim of that gear may also become offset from the rotational axis of the hub under working conditions.

SUMMARY OF THE INVENTION

In accordance with the present invention, a stress dissipating gear is provided which is comprised of a central radial hub with a web radially extending therefrom and an independent radial gear-toothed rim, both of which are radially coupled by a stress dissipating resilient member attached thereto and being located in a plane parallel to that of said web. The resilient member is laterally supported by the adjacent web and the side walls of the resilient member are proximately parallel to the web side walls such that there is no resilient material located between the outer peripheral edge of the web and the inner peripheral edge of the rim. Furthermore, the present invention comprises a process by which such a stress dissipating gear is manufactured.

The configuration of the gear of the present invention allows the resilient member to absorb internal stresses created between the hub and the gear-toothed rim due to instantaneous shocks created by gear start-up or shut-down and cyclical fatigue. Furthermore, the web supplies lateral rigidity to the resilient member such that the resilient member will resist angular torsional deformation in a direction normal to the rotational axis. Moreover, the close proximate relationship of the web's outer peripheral edge to the rim's inner peripheral edge, without a resilient ring therebetween, prevents rotational axis misalignment between the rim and the hub.

By matching the bulk torsional rigidity of the resilient member, which is a function of its modulus of elasticity and its dimensions, to that of the tooth performance proportions, the beneficial characteristics of a conventional single piece homogenous gear are maintained while the resilient member acts to synergistically dissipate stresses between the gear-toothed rim and the hub. The present invention construction and process to manufacture such a gear may be applied to parallel axis spur and helical gear sets, to nonparallel coplanar intersecting axis bevel and face gears, to nonparallel noncoplanar nonintersecting axis worm, hypoid, spiroid and helican gears, and to special square, rectangular, triangular, elliptical or scroll gears.

Additional objects, advantages, and features of the present invention will become apparent from the following description and appended claims, taken in conjunction with the accompanying drawings.

DETAILED DESCRIPTION OF THE PREFERRED EMBODIMENT

Figure 1:
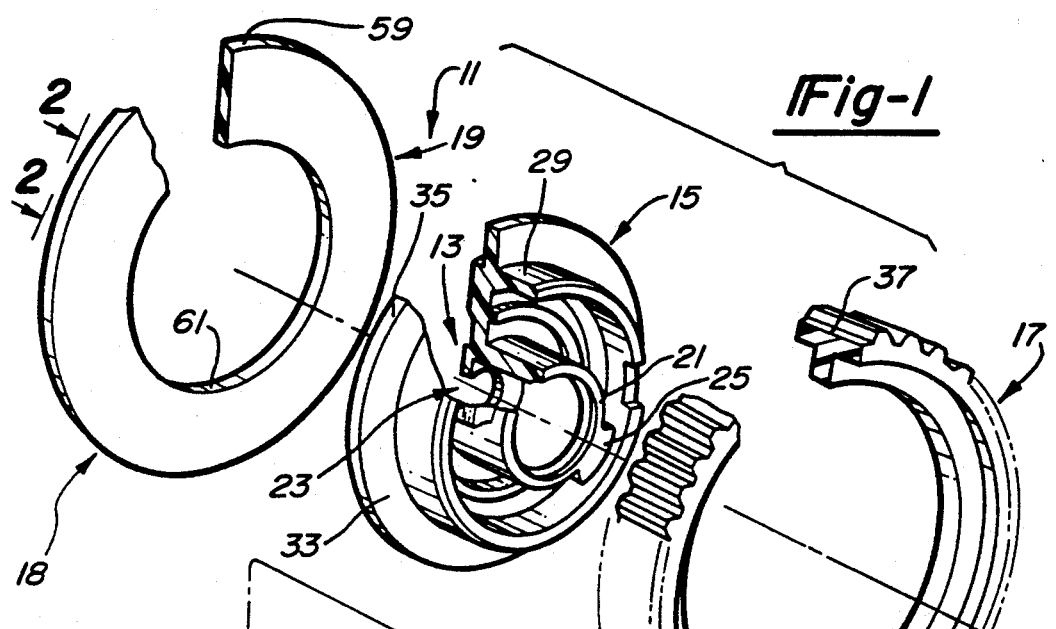
FIG. 1 is an exploded perspective view, with a portion broken away therefrom, of the preferred embodiment of the present invention gear.
Figure 2:
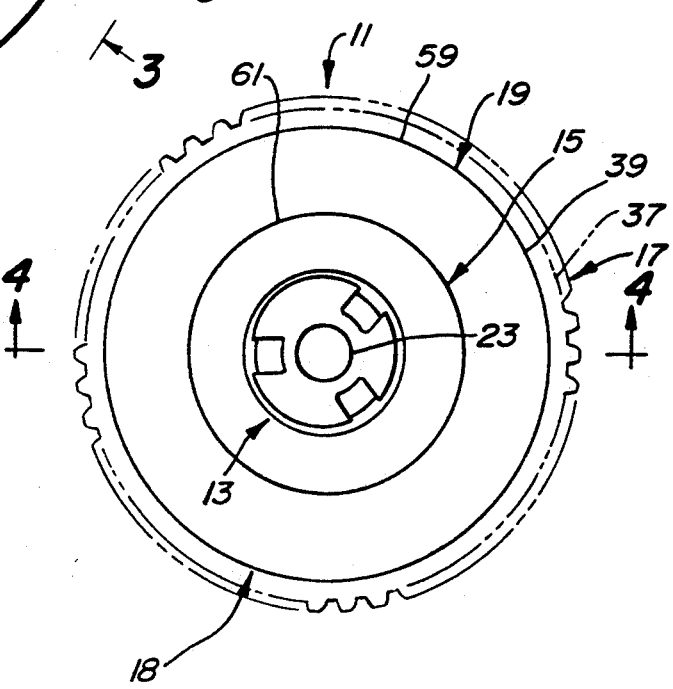
FIG. 2 is a side view of the preferred embodiment of the present invention gear, take from FIG. 1 in the direction of arrow 2.
Figure 3:
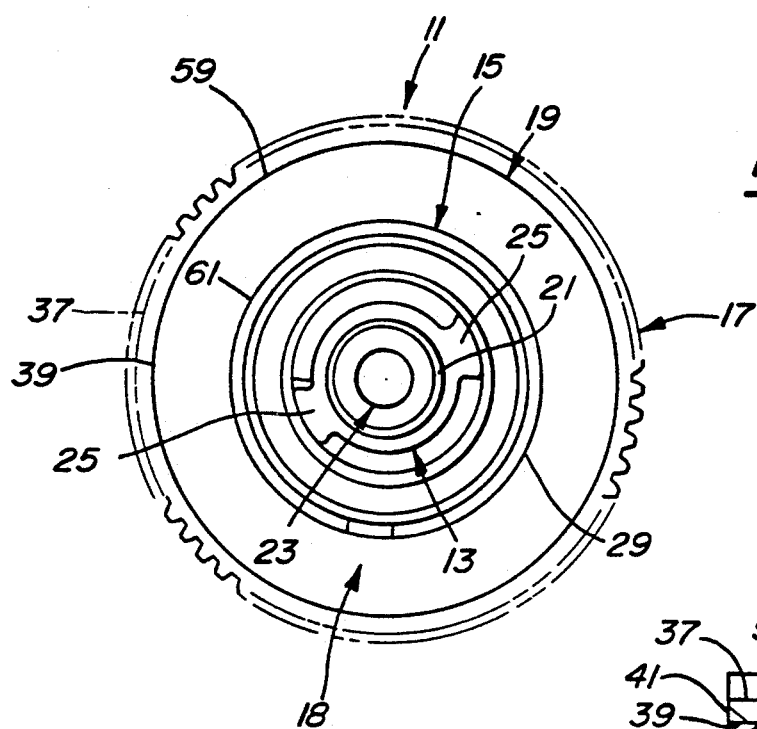
FIG. 3 is a side view of the preferred embodiment of the present invention gear, taken from FIG. 1 in the direction of arrow 3.
Figure 4:
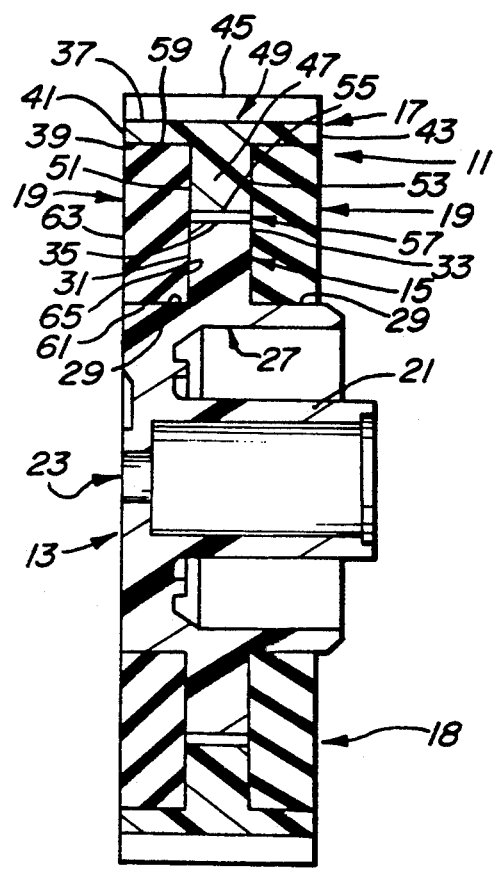
FIG. 4 is a cross-sectional view of the preferred embodiment of the present invention gear, taken along line 4—4 in FIG. 2.

The preferred embodiment of the stress dissipation gear of the present invention varies depending on the correct match between the application performance requirements of the gear teeth and the characteristics of the resilient member. For example, the preferred embodiment of the stress dissipation gear of the present invention for an automotive window lift motor application is shown at 11 in FIGS. 1–4. Gear 11 has a hub 13, a web 15, a gear-toothed rim 17, and a pair of resilient members 19. The hub 13 is centrally located adjacent to the rotational axis of the gear 11. A power generating shaft (not shown) is fit within a collar 21 and an opening 23 within the hub 13. A pair of wings 25, outwardly affixed to the collar 21, serve to rotationally lock the shaft onto the hub 13.

In this first embodiment, the web 15 extends radially outward from the center 27 of a circumferential outer wall 29 of the hub 13. Web 15 consists of a pair of side walls 31 and 33 which terminate in an outside peripheral or radial edge 35. The hub 13 and web 15 are preferably made from a thermoplastic material, of which a 33 percent glass fiber reinforced Nylon 6/6 has been found to be suitable.

The rim 17 has an outside peripheral surface 37, an inside peripheral surface 39 joined by a pair of side walls 41 and 43. A plurality of gear teeth 45, designed and manufactured by traditional methods as would be known to one skilled in the art, project radially outward from the outside peripheral surface 37. An inner rib 47 extends radially inward from the center 49 of the inside peripheral surface 39 of the rim 17. The inner rib 47 has a pair of side surfaces 51 and 53 which terminate at an inside radial rib edge 55. The inner rib 47 of the rim 17 proximately corresponds with and is aligned in the same plane as the web 15 such that the inside radial rib edge 55 is adjacent and circumferentially parallel to the outside edge 35 of the web 15. A radial gap 57 is located between inside radial rib edge 55 and outside edge 35. While the narrower the radial gap 57 the closer gear 11 will match performance characteristics of a homogenous material gear, a gap of at least .001 inch is believed to be necessary to ensure minimal radial compression and to allow for some independent relative rotation of the rim 17 and hub 13 under high torsion stress conditions. It is contemplated that radial gap 57 may be filled with a Teflon coating in order to reduce frictional resistance between the inside radial rib edge 55 and the outside edge 35 of the web 15. In the embodiment shown and described, the rim 17 is also made from a suitable thermoplastic material such as 33 percent glass fiber reinforced Nylon 6/6, but may also be made of any other suitable material such as steel, plastic, composites, and the like, which provides sufficient rigidity and strength for the drive torque necessitated by the application desired.

The resilient member 19 has a disk-like shape, being radial along a top surface 59 and a bottom surface 61, and being laterally flanked by a pair of side faces 63 and 65. The resilient member 19 is preferably adhesive-bonded along the top surface 59 to inside surface 39 of rim 17. Similarly, the bottom surface 61 of resilient member 19 is preferably adhesive-bonded to circumferential outer wall 29 of hub 13. An adhesive brand primer known as Chemlok 45 and an adhesive brand known as Tyrite 7500 A/C, both of which are manufactured by Loed Corporation, have sufficient bonding strength for this application. Alternatively or in addition to the adhesive bonding, holes (not shown) can be pieced cross-sectionally through the web 15 and through the inner rib 47 such that with the preferred processing steps, a portion of the resilient member 19 will fill these pierced holes and provide a mechanical bond to replace and/or supplement the aforementioned adhesive bond.

A significant advantage of the present invention is that resilient member 19 is laterally supported by web 15 and inner rib 47 of the rim 17. This lateral support substantially reduces angular torsional movement, in a direction normal to the rotational axis, of the rim 17 independent from the hub 13. For the embodiment of gear 11 shown in FIGS. 1–4, the resilient member 19 is preferably made from the polymer Santoprene 101-55 which is an olefinic cross-linked thermoplastic elastomer manufactured by Advanced Elastomer Systems. Santoprene 101-55 has a Shore hardness value of 55. It is important that the rigidity, modulus of elasticity, and thickness characteristics of the resilient member 19 be properly matched to the gear tooth performance parameters.

Figure 5:
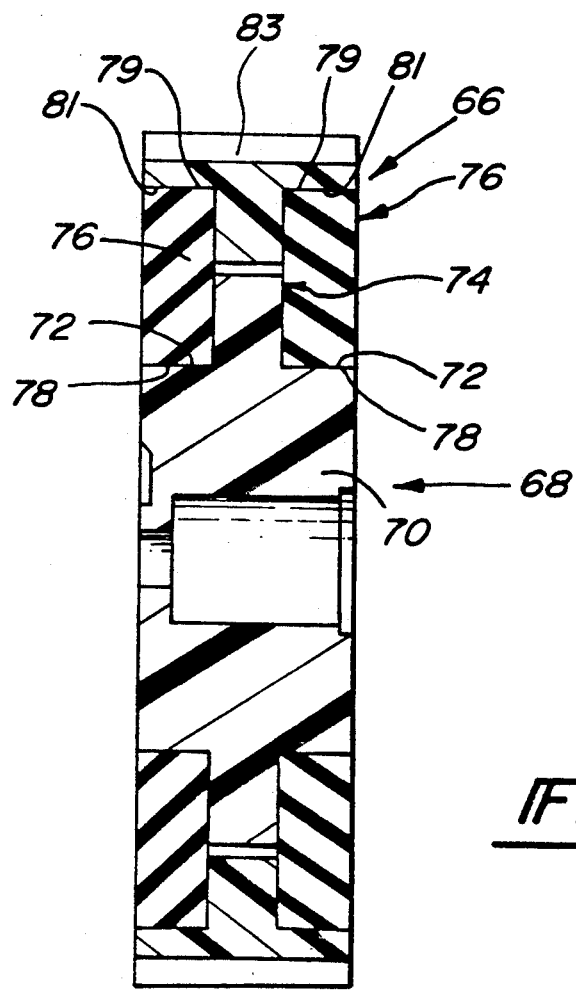
FIG. 5 is a cross-sectional view similar to that shown in FIG. 2 of an alternate embodiment of the present invention gear.

An alternate embodiment of the present invention gear can be seen in FIG. 5. This gear 66 is similar to that of the preferred embodiment except that the hub 68 has no collar or wings. A shaft (not shown) is merely screwed into a flat central radial portion 70 which is circumferentially bordered by a peripheral hub shoulder 72. A web 74 radially extends outward therefrom. A resilient member 76, similar to that of the first embodiment, has its radially inner surface 78 adhesively bonded to the peripheral hub shoulder 72.

Figure 6:
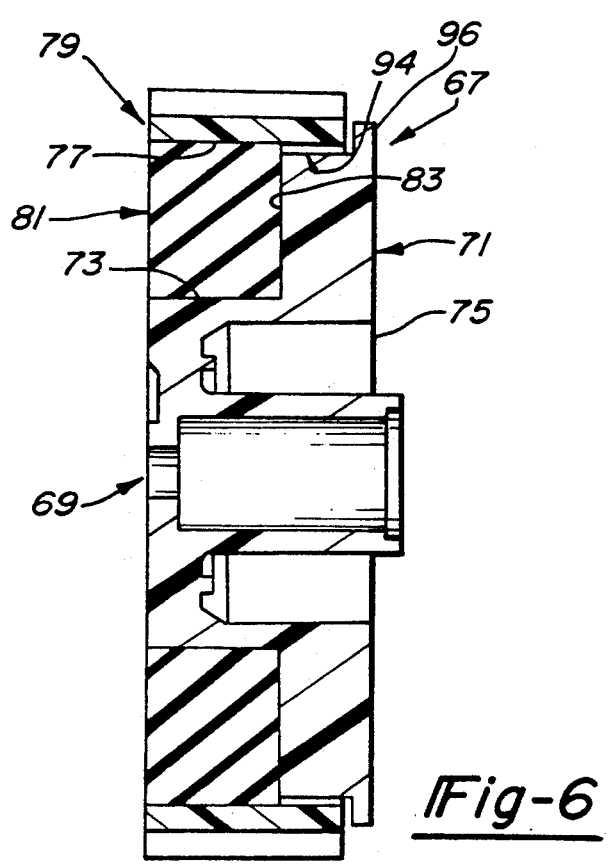
FIG. 6 is a cross-sectional view similar to that shown in FIG. 2 of a second alternative embodiment of the present invention gear.

In a second alternative embodiment, the gear 67 has a hub 69 shaped similar to that of the first embodiment hub 13 of gear 11. This can best be seen in FIG. 6. However, with this second alternative embodiment, the web 71 is no longer centered upon circumferential outer wall 73 of the hub 69, but is positioned at one extreme lateral edge 75 of the hub 69. In such an embodiment the web radially extends outward to a corresponding position proximate to the inside surface 77 of the rim 79. It should be noted that in this configuration the rim 79 does not have an inner rib. A single resilient member 81 is located on the cavity side 83 of web 71 and is adhesively bonded to the inside rim surface 77 and to the circumferential outer wall 73 of hub 69. An advantage of this embodiment is that the resilient member 81 may be substantially thicker in cross sectional width than that of the preceding embodiments. Furthermore, in the embodiment of gear 67 there is one less part to be manufactured and assembled thereby decreasing the overall cost of gear 67.

Figure 7:
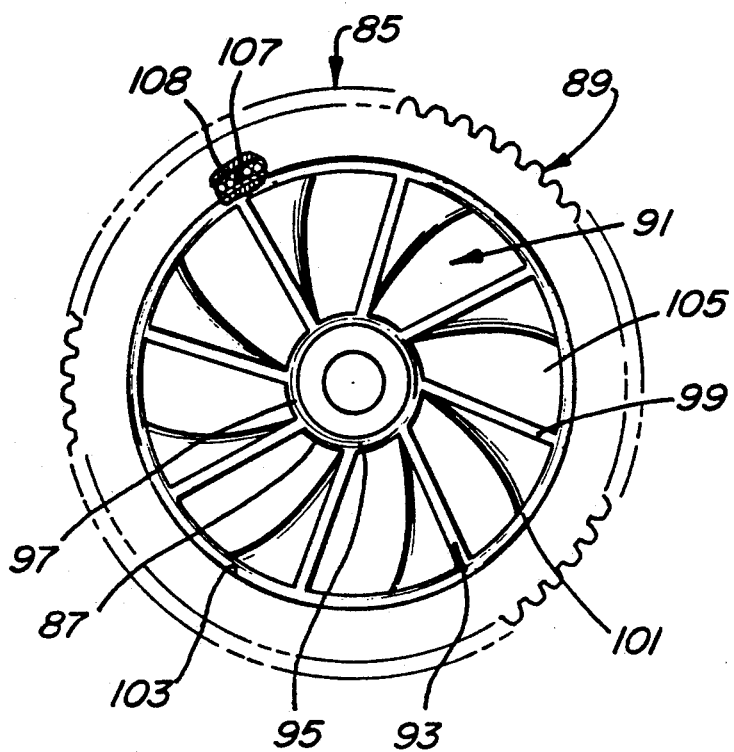
FIG. 7 is a side view of a third alternate embodiment of the present invention gear.

As is shown in FIG. 7, a third alternative embodiment gear 85 comprises a hub 87 of similar design to the hub 69 of the second alternative embodiment gear 67. Gear 89 further comprises a gear-tooth rim and web 91 which are substantially similar in configuration to the rim 79 and the web 83 of the second alternative embodiment gear 67. Lastly, gear 85 comprises a unique spoken resilient member 93. The resilient member 93 has an inner radial band 95 which peripherally surrounds the circumferential outer wall 97 of the hub 87. Spokes 99 extend radially outward from the inner radial band 95 and join with an outer radial band 101 which internally borders an inside surface 103 of the rim 89. A void 105 is created between each pair of spokes 99. In this embodiment, the hub 87, the web 91 and the gear toothed rim 89 can be made from the same high modulus materials as the other embodiment hubs, webs, and rims such as steel, plastic, cast iron, bronze, composites, and the like. However, the resilient member 93 is preferably made from spring steel or the like with the spokes 99 formed such that the resilient side is facing the direction of rotational movement of the gear. Moreover, in this embodiment, as well as the prior embodiments shown, it may be desirable to have a ball bearing race 107 located within the gap 95 created between the web 91 and the inside surface 103 of the rim 89. This will significantly reduce any frictional resistance created when the rim 89 rotates independent from the hub 87.

The gears 11, 66, and 67 can be cost effectively produced through a multi-step injection molding process. Referring to the preferred embodiment gear 11, the hub 13, web 15 and rim 17 are first injection molded within a precut tool cavity (not shown). The radial gap 57 between the web 15 and the rim 17 is created by protruding tool metal, thus, the minimum gap dimension is dictated by normal tooling maintenance requirements. A few thin bridges (not shown) may need to be molded between the rim 17 and the web 15 so that this first step molding can be readily transferred to a second station (after which any such connecting bridges would be removed). In the second station, an adhesive coating will be applied to the inside surface 39 of the rim 17 and to the outside surface of the circumferential outer wall 29. Lastly, the synthetic elastomeric resin is injection molded in place over the hub 13, web 15, and rim 17. With respect to the third alternative embodiment gear 85, the resilient members 93 may be manufactured by a powdered metal molding process.

It will be appreciated that the present invention represents a significant quality improvement by reducing internal gear stresses. Due to start-up shocks, shutdown shocks, and cyclical fatigue the resilient member absorbs and dissipates many of the stresses created between the hub and the gear-toothed rim such that the hub and the rim are allowed to temporarily rotate independent from one another. Furthermore, the process by which the gear of the present invention can be produced is very cost effective and accurate.

While a number specific embodiments of this gear and the process to make such have been disclosed, it will be appreciated that various modifications may be made without departing from the present invention. For example, while a spur gear has been depicted and described, it will be appreciated that a similar construction and process can be applied to other types of gears. Furthermore, while various materials have been disclosed in an exemplary fashion, various other materials may of course be employed as long as the teeth and hub regions have sufficient rigidity and strength to provide the drive torque required by the desired application. It is intended by the following claims to cover these and any other departures from these disclosed embodiments which fall within the true spirit of this invention.

The invention claimed is:

1. A gear comprising:

a central radial member having a central rotational axis therein with a pair of center side walls radially extending outward therefrom, said center side walls being bordered by an outside peripheral edge, said center side walls having a generally planar surface thereupon, said central radial member operable for being rotated about its central rotational axis by a power generating means;

a radial rim member having the same central rotational axis as said central radial member, said radial rim member having geared-teeth extending outwardly therefrom, said radial rim member further having an inside rim surface being radially planar in attitude, said inside rim surface being of greater diametral circumference than the diametral circumference of said outside peripheral edge of said central radial member; and a resilient member being of radial disk-like shape with a pair of generally planar side faces thereof bordered by a top surface and a bottom surface, said resilient member being attached to said radial rim member and to a portion of said central radial member, said resilient member being clear of a small radial gap created between said outside peripheral edge of said central radial member and said radial rim member;

whereby, said resilient member couples said radial rim member to said central radial member thereby allowing the geared-tooth portion of said radial rim member to transmit power to a mating part proximate thereto, said resilient member dissipating stresses created between said central radial member and said radial rim member with said center side walls substantially preventing said resilient member from allowing said radial rim member to angularly torque in a direction normal to the rotational axis of said gear.

2. The gear of claim 1 wherein said resilient member is coupled to said radial rim member and said central radial member by attachment of said top surface of said resilient member to said inside rim surface and attachment of said bottom surface of said resilient member to a portion of said central radial member other than to an outside peripheral edge of said center side walls.

3. The gear of claim 2 wherein said central radial member forms a hub portion having a circumferential outer wall with an opening centrally located therewithin such that a power generating shaft can be affixed thereto for axially rotating said gear, said center side walls creating a web portion extending radially outward from said hub portion.

4. The gear of claim 3 wherein said inside rim surface has a centrally located rib extending radially inward therefrom, said rib proximately corresponding in planar alignment with said web, said radial gap being created between an inside radial edge of said rib and an outside peripheral edge of said web portion.

5. The gear of claim 4 wherein said web portion is generally located centrally, in a direction normal to said rotational axis, upon said hub portion; and a resilient member is attached proximate to each of said center side walls.

6. The gear of claim 3 wherein said web portion is offset toward a lateral side of said hub portion; and said resilient member substantially fills the radial cavity created between said circumferential outer wall of said hub, said inside rim surface and one of said center side walls of said web.

7. The gear of claim 1 wherein said resilient member is comprised of a synthetic elastomeric polymer.

8. The gear of claim 1 wherein said resilient member is comprised of a natural rubber compound.

9. The gear of claim 3 wherein said top surface of said resilient member is adhesively bonded to said inside rim surface and said bottom surface of said resilient member is adhesively bonded to said circumferential outer wall of said hub portion.

10. The gear of claim 3 wherein said resilient member has an inner radial band adapted to be affixed to said circumferential outer wall and an outer radial band adapted to be affixed to said inside rim surface, said resilient member having a central spoked portion comprising a plurality of spokes with voids therebetween, said plurality of spokes being normal to the plane of the gear and extending radially outward from said inner radial band to said outer radial band.

11. The gear of claim 10 wherein said resilient member is comprised of spring steel with said plurality of spokes being resilient in the direction of rotational movement.

12. The gear of claim 1 wherein a ball bearing race is located in said gap.

13. The gear of claim 1 wherein friction-reducing material is located in said gap.

14. A stress dissipation gear comprising:
a central radial member having a central rotational axis therein with a pair of center side walls radially extending outward therefrom and being bordered by an outside peripheral edge to form a web portion, said center side walls being generally planar and having a greater diametral size than the width of said outside peripheral edge, said central radial member operable for being rotated about its central rotational axis by a power generating means;
a radial rim member having the same central rotational axis as said central radial member, said radial rim member having geared-teeth extending outwardly therefrom, said radial rim member further having an inside rim surface being radially planar in attitude, said inside rim surface being predominately of greater diametral circumference than the diametral circumference of said outside peripheral edge of said central radial member; and
a resilient member being of a radial disk-like shape with a pair of generally planar side faces thereof bordered by a top surface and a bottom surface, said resilient member being attached to said radial rim member and said central radial member by attachment of said top surface of said resilient member to said inside rim surface and attachment of said bottom surface of said resilient member to a portion of said central radial member other than to said outside peripheral edge of said center side walls, said resilient member being clear of a small radial gap created between said outside peripheral edge of said central radial member and said radial rim member.

15. A method of manufacturing a stress dissipation gear having a hub with a web radially extending outward therefrom, an independent radial gear-toothed rim, and a resilient member for coupling said radial gear-toothed rim to said hub, said method comprising:
molding said hub, web and rim in a first station;
molding an elastomeric resin directly onto a portion of said hub, web and radial gear-toothed rim, whereby said resilient member is thereby formed and attached to a portion of said radial gear-toothed rim and to a portion of said hub.

16. The method of claim 15 further comprising:
applying adhesive to a portion of said radial gear-toothed rim and to a portion of said hub, thereby enhancing the attachment of said resilient member thereto.

17. The method of claim 15 wherein said molding operations is performed with polymeric injection molding machines, said hub, web, and rim are molded from 30 percent glass reinforced Nylon 6/6, and said elastomeric resin is Santoprene.

* * * * *